No. 652,178. Patented June 19, 1900.
J. GAYLEY.
APPARATUS FOR DRYING AIR.
(Application filed Nov. 1, 1897. Renewed May 3, 1900.)
(No Model.) 4 Sheets—Sheet 1.
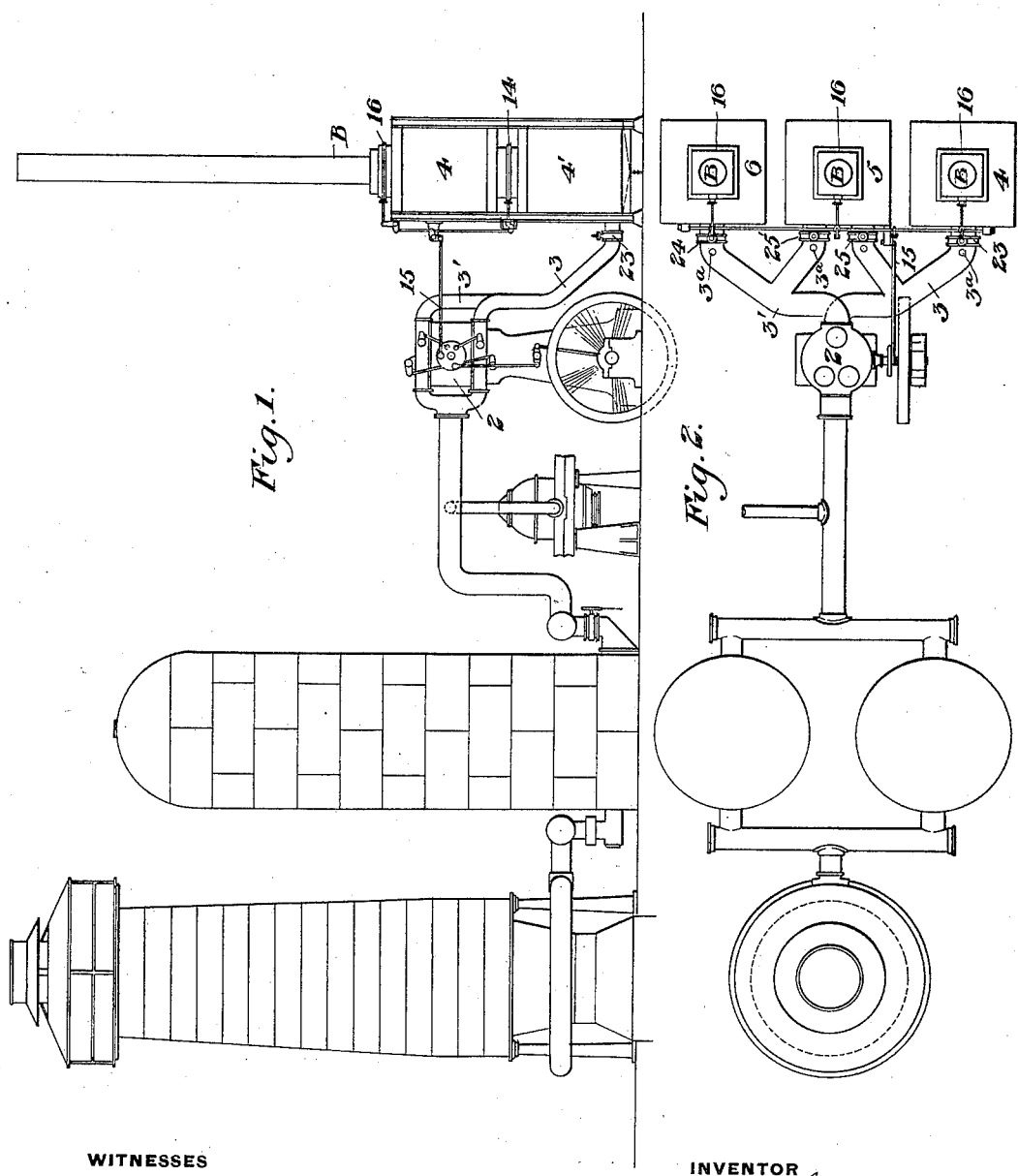
WITNESSES
INVENTOR No. 652,178. Patented June 19, 1900.
J. GAYLEY.
APPARATUS FOR DRYING AIR.
(Application filed Nov. 1, 1897. Renewed May 3, 1900.)
(No Model.) 4 Sheets—Sheet 2.
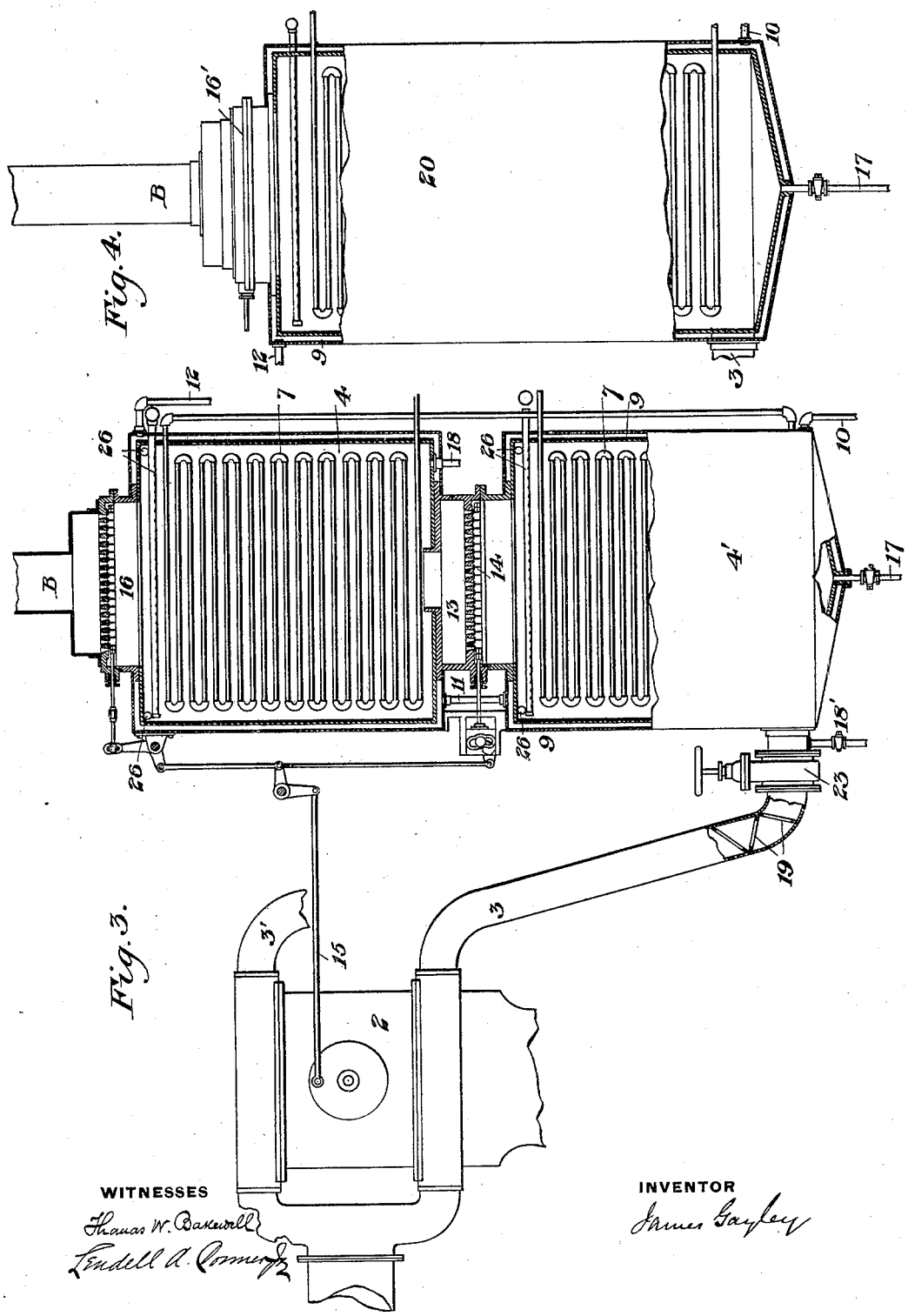
WITNESSES
INVENTOR

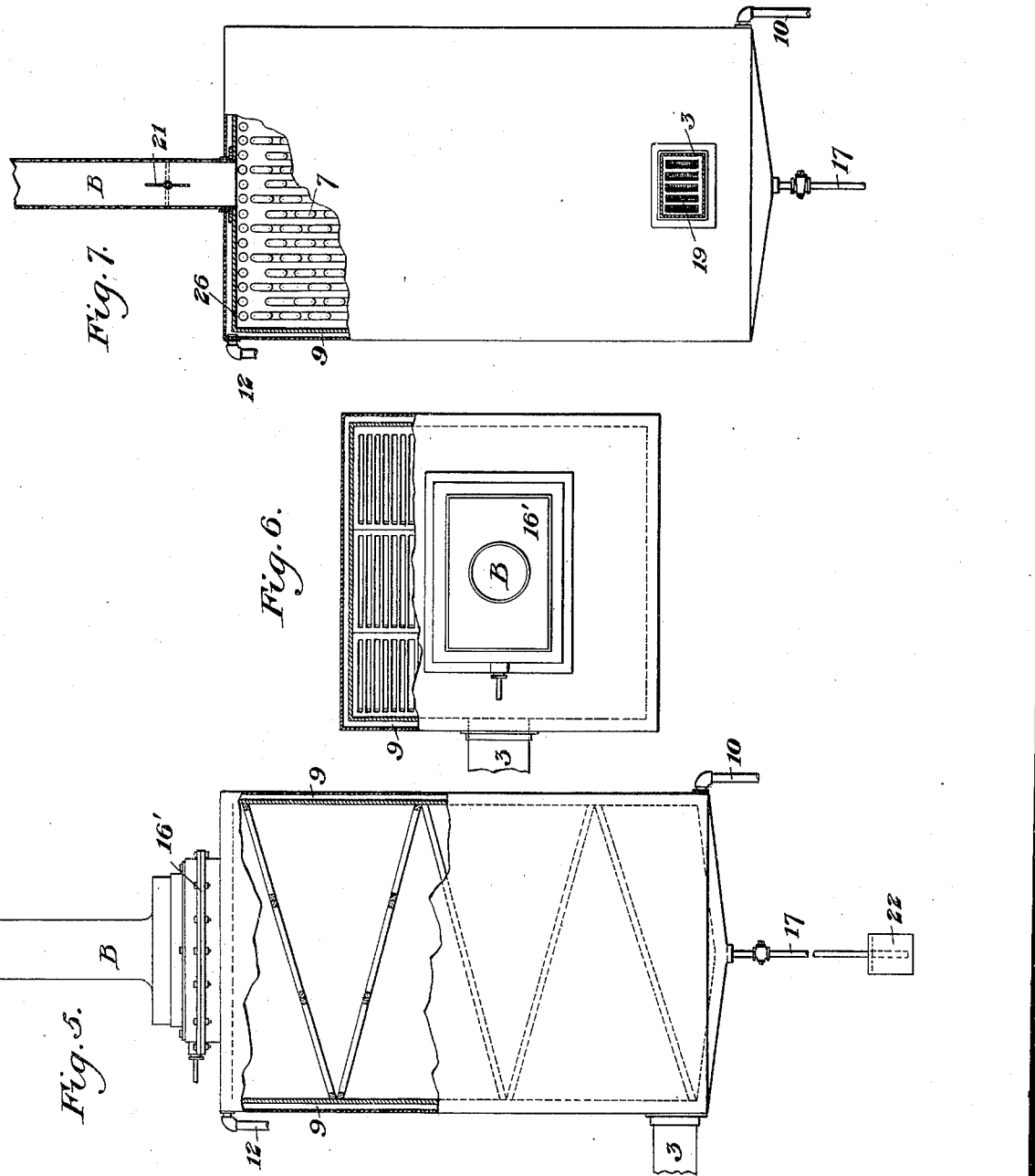

No. 652,178. Patented June 19, 1900.
J. GAYLEY.
APPARATUS FOR DRYING AIR.
(Application filed Nov. 1, 1897. Renewed May 3, 1900.)
(No Model.) 4 Sheets—Sheet 4.
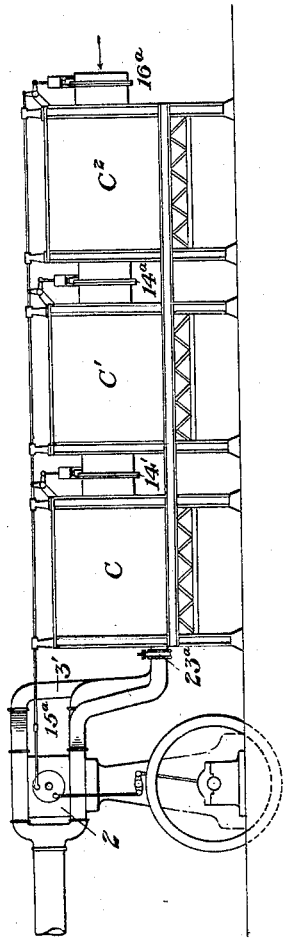
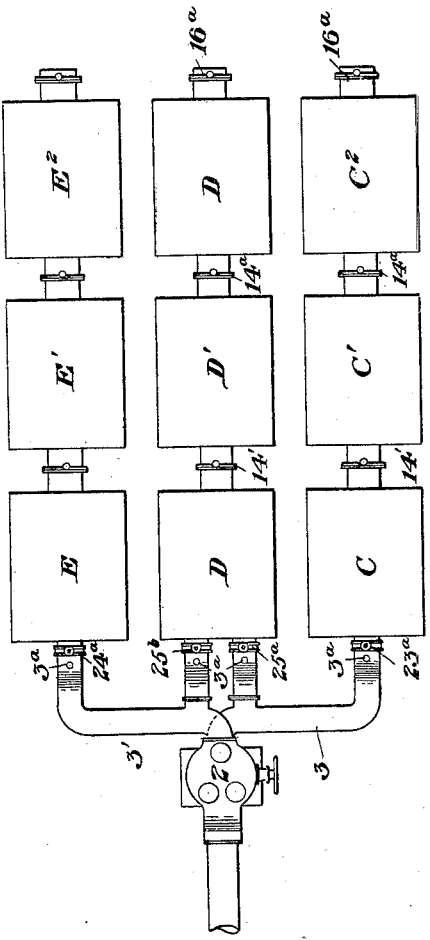
WITNESSES
INVENTOR

UNITED STATES PATENT OFFICE.

JAMES GAYLEY, OF PITTSBURG, PENNSYLVANIA.

APPARATUS FOR DRYING AIR.

SPECIFICATION forming part of Letters Patent No. 652,178, dated June 19, 1900.

Application filed November 1, 1897. Renewed May 3, 1900. Serial No. 15,412. (No model.)

*To all whom it may concern:*

Be it known that I, JAMES GAYLEY, of Pittsburg, in the county of Allegheny and State of Pennsylvania, have invented a new and useful Improvement in Apparatus for Drying Air, adapted to extract moisture from air for use in blast-furnaces and steel-converters and other purposes in the arts for which dry air is useful, of which the following is a full, clear, and exact description, reference being had to the accompanying drawings, forming part of this specification, in which—

Figure 1 is a side elevation of my improved apparatus applied to the work of drying the air supplied to a blast-furnace and converter. Fig. 2 is a plan view thereof. Fig. 3 is a vertical section, on a larger scale, of one of the double refrigerating-chambers shown in Fig. 1. Fig. 4 is a vertical section showing a modified construction of refrigerating-chamber, modified in that it is a single chamber instead of being double or compound, as in Figs. 1, 2, and 3. Fig. 5 is a view similar to Fig. 4, illustrating refrigerating apparatus modified by the substitution of grids for pipes for breaking up the air-currents. Fig. 6 is a top plan view of Fig. 5, partially broken away. Fig. 7 is another modification of the construction of the refrigerating-chamber, wherein the air-inlets are of smaller area than the outlet. Fig. 8 is a view showing a modified arrangement of three groups of refrigerating-chambers, each group having its members arranged in tandem; and Fig. 9 is a side elevation thereof.

The successful conduct of all metallurgical operations depends to a great extent on the uniformity of the various materials used in the process. In operating blast-furnaces and steel-converters, cupolas, &c., one of the most disturbing influences is the varying amount of moisture in the atmosphere, since in such processes a large amount of air is consumed for the purposes of oxidation or combustion. The atmosphere holds in suspension quantities of aqueous vapor varying from .20 to 1.6 per cent., and its presence in these metallurgical operations is injurious, not only because it is decomposed in the apparatus, and thus consumes and absorbs much heat, but the fluctuations in the quantity of moisture carried by the air produces corresponding irregularities in the conduct of the metallurgical process and in the quality of the product. Thus in the State of Pennsylvania from the months of April to September, inclusive, the air contains at least fifty per cent. more moisture than the average for the other months of the year, and often for short periods of time the ratio of difference is very much greater. When it is considered that when a blast-furnace uses per minute one thousand cubic feet of air containing one grain of moisture per cubic foot one gallon of water enters every hour and that the smaller blast-furnaces use per minute eight thousand cubic feet of air and the larger ones forty thousand cubic feet, each cubic foot containing from two to eight grains of moisture, it becomes apparent that uniform conduct of the process is rendered practically unattainable. In consuming thirty thousand cubic feet of air per minute containing two grains of moisture per cubic foot sixty gallons of water per hour are delivered to the furnace, and when the air contains eight grains of moisture per cubic foot two hundred and forty gallons are delivered per hour. As the decomposition of this large quantity of aqueous vapor is accomplished at the expense of heat, the varying conditions caused by the atmosphere alone will be readily appreciated. Thus in the summer months, because of the greater content of moisture in the air, two hundred more pounds of fuel, on an average, are required to produce a ton of pig-iron than in the winter months. These facts make it very difficult for the blast-furnace manager to secure uniformity of product. Variations in the content of moisture in the atmosphere produce irregularity in the operation of the furnace and affect the quantity of fuel necessary to be used, and these varying conditions in turn make irregular the chemical composition of the pig metal with reference to their non-metallic constituents—carbon, silicon, &c. The value of the product is thus often impaired, and the uncertainty of the result which will be attained in any given tapping of the furnace is a matter of most serious inconvenience. In the operation of the Bessemer converters the moisture of the atmosphere and its variations in amount are just as troublesome. Its presence in large quantity causes a cooling of the metal bath, which interferes with the uniform conduct of the process and often produces wasteful chilled heats. In order to obviate these bad effects, it is necessary to charge into the converter a pig-iron containing a sufficiently-large content of silicon to raise the temperature of the blow, and thus neutralize the chilling effect of the moisture. Additional fuel in the blast-furnace is required to produce such high-silicon metal. My invention is designed to make it possible to remove by refrigeration the moisture from the air-blasts used in such metallurgical processes under the peculiar and difficult conditions caused by the rapid flow and large volume of the air employed, which conditions would cause difficulties in all apparatus and methods of drying by refrigeration heretofore known. By my invention I can render the air dry or so dry, at least, that the percentage of moisture contained in it is small and practically uniform and is reduced to such percentage that it does not affect adversely the results desired to be accomplished by its use. I effect this by submitting the air to refrigeration, employing means to interrupt its flow through the refrigerating apparatus and subjecting such air to rarefaction in contact with cooled surfaces, all of which steps may be used together or in part. By these means the moisture is condensed and is collected in the form of water or snow, the air being then fed to blast-furnaces or converters or used for other purposes in the arts.

In order to reduce air from a high to a low temperature, I have found that it can be done more efficiently and economically through a number of operations than at one operation, and I believe I am the first to introduce a method of refrigerating air to remove the moisture contained, which consists of a series of interrupted operations and in which each operation produces a lowering of the temperature. I am aware that methods are known for producing cold dry air by allowing it to expand; but in such methods the air is first compressed to a high pressure, which is a heating operation. In the method I have devised the steps are cooling the air by contact with cooled surfaces when the air is alternately in motion and at rest.

Many forms of apparatus suitable to the practice of the invention may be employed. I have, however, devised special apparatus for the purpose which possesses many advantageous qualities for refrigerating air and is claimed specifically by me herein, although the broader claims of the application are not restricted to its use.

Referring now to the drawings, in Figs. 1, 2, and 3, 2 represents the blast-engine or air-compressor shown in connection with a converter, a hot-blast stove, and a blast-furnace. 3 3' are conduit-pipes for conducting air from the refrigerating-chambers to the engine. 4 5 6 are refrigerating-chambers, each comprising two or more parts 4 4' 5 5' 6 6', placed one above the other or end to end, inside of which parts or chambers are coils of metal pipe 7, arranged in any convenient and mechanical form in order to obtain as much contact with the air as possible, and through these coils is caused to circulate a refrigerating substance or fluid. Each of these chambers is covered on the outside with a heat-insulating cover or jacketed with a space 9, through which circulates a refrigerating fluid, (shown entering at 10,) passing up around each lower chamber 4', 5', or 6' into the upper chamber 4, 5, or 6 by pipes 11 and leaving the upper chamber through a pipe 12. The upper and lower chambers are connected by a neck or pipe 13, in which is a valve 14, operated from the engine by any suitable movement with the connecting-rod 15 or by means of a cam, for which purpose various contrivances will occur to the skilled mechanic. On top of the upper chamber is an inlet-pipe B, containing a valve 16, operated by mechanism similar to that of the valve 14 or from the same actuating-rod. The pipe 3 may either communicate directly with the atmosphere or with other chambers—as, for example, in Figs. 8 and 9. At the bottom of the lower chamber 4' is a pipe 17 for drawing off the condensed water, which may be done by various means adapted to counteract the suction when the air in the chamber is rarefied. The neck 13 is not flush with, but extends above the bottom of the upper chamber 4, so that the condensed water may not flow down into the lower chamber, but may be drawn off through a pipe 18. In the conduit-pipes 3 3' I place grids or screens 19, in order to collect any mist escaping from the refrigerating-chambers. The deposited moisture can run down and be drawn off through pipe 17 or may be drawn off through special waste-pipes 18' set in the conduits. In Fig. 2 the conduit-pipe 3 is shown leading to the chambers 4 and 5, and the conduit-pipe 3' leads to the chambers 5 and 6, suitable branch pipes being employed. Valves are placed in the conduits, enabling any of the chambers to be cut off. The chamber 5 5' may be used as a spare or reserve chamber, and in such case is normally disconnected from the conduits, or it may be used regularly and constantly to alternate in action with the other two chambers, as hereinafter explained. 3ª are openings in the conduit-pipes closed with lids, in which hygrometers may be inserted to test the dryness of the air passing from the chambers.

I shall now describe the method of carrying out my invention in the apparatus above described.

The air can be drawn to the engine or compressor through two or more connecting chambers, like 4 4', in which the valves 14 and 16 may be kept open to operate with refrigeration alone or actuated to make use of rarefaction as an aid to refrigeration in precipitating the moisture. In Figs. 1, 2, and 3 when the piston in the air-cylinder of the engine 2 is making the upstroke the engine obtains air through the conduit 3 from one chamber 4 4' and on the downstroke it obtains air through the conduit 3' from another chamber 6 6', and by this means an interruption in the flow of air through each chamber in succession is produced and the air therein is in stationary contact with the cooling pipes and surfaces of the chamber for substantially the whole of each alternate stroke of the piston. By means of this intermission the heat is extracted much more rapidly and efficiently than when the air is in motion. The object is to have separate cooling apparatus for each up-and-down or forward-and-backward stroke of the engine as may make a revolution, in order to cause an interruption of the flow of air through such chambers for a space of time longer than the mere moment which is required for the engine to turn its center. In the continued running of the engine the air is thus maintained at rest and in contact with cooling-surfaces not only during one period, but for a considerable number of periods, during its passage through the cooling-chamber. This succession of frequent periods of motion and rest of the air in the cooling-chamber is imparted by appropriate automatically-actuated valve mechanism, which may consist of special valves applied to the cooling-chambers or of the air-inlet valves of the engine.

When each chamber is double and comprises two chambers or compound chambers, like 4 and 4' or 6 6', I prefer to operate as follows: The piston starting on the upstroke draws in air through the conduit 3 from the lower chamber 4'. The valve 14 being closed, a portion of the air in the chamber 4 is drawn into the air-cylinder of the engine and exhausts or rarefies the air in the chamber by and to the extent of the air removed. The chamber is of such size—being much larger than the capacity of the pump-cylinder—that one stroke exhausts only a portion of the air contained in it. During the upstroke of the piston the valve 16 is opened to supply air to the upper chamber 4. On the downstroke of the piston, the air for which is obtained from another double chamber similarly constructed—namely, the chamber 6 6' and having similarly-operated valves—the inlet-valve 16 of the chamber 4 is shut and the valve 14 is open, equalizing the pressure of the air in the chambers by the admission into the chamber 4' of air from the upper chamber 4, the air in both chambers then immediately assuming the same pressure, and the rarefied air is kept at rest in these chambers and in contact with cooled surfaces during the whole of the downstroke. On the next upstroke of the pump-piston, the valve 16 being open and the valve 14 closed, the air in the chamber 4' is further rarefied and the chamber 4 is replenished with atmospheric air. The air in the lower chamber 4', connected to the blast-engine, becomes thus more and more rarefied at each upstroke, and through mixing or equalizing after each downstroke of the engine with the atmospheric air in the upper chamber a practical equilibrium in the condition of the air in both chambers is obtained. Eventually a practical mean is reached and remains the same at each stroke of the engine. It is necessary to have the chambers constructed in such manner that they shall be air-tight and the air only admitted to the chambers through the pipes B and 13. The valves 14 and 16 are operated so that when one is open the other is shut.

It will be understood that the operation of the chambers 4 4' and 6 6' are alike, the air being drawn from the chamber 4 4' at each upstroke of the piston and from the chamber 6 6' at each downstroke, or vice versa. Correspondingly at each downstroke the pressure in the chambers 4 4' is equalized by the opening of the intermediate valve 14, while at each upstroke the inlet-valve 16 into the chamber 4 opens and the intermediate valve is closed. Like actions occur in the chamber 6 6' at respectively alternate strokes of the engine. By this method of operating the air in one part of the chamber 4 4' (the upper chamber) is alternately at atmospheric pressure and rarefied and in the other chamber the air is alternately in a greater and less state of rarefaction, and I thus obtain with two chambers what may be called "progressive rarefaction." I may add more chambers in the series, making the arrangement of each chamber 4 4' 6 6' multiple instead of double, as shown, and rendering rarefaction progressive from one to the other. By these means I effect substantial refrigeration with only a limited use of refrigerants or cooling agents, and I am able to maintain a supply of rarefied air in the chambers and supply one chamber with rarefied air from another.

The principle above described, consisting in producing dry air by maintaining a supply of rarefied air in a chamber and replenishing the withdrawals therefrom with air from another closed chamber, so as to maintain the rarefaction of the first chamber, is new. I therefore purpose claiming the same broadly.

The process of rarefaction in the production of dry air by refrigeration is of great assistance in reducing the air to a low temperature and enables the process to be carried on at less expense of apparatus and refrigerating material. When air is exhausted from a chamber, the air remaining expands, performs work, and becomes cool. The moisture is precipitated in the form of a mist, which disappears on the admission of a fresh supply of air; but if there are cooled surfaces present when the mist is formed the mist will condense on the cold surfaces which I have shown in the drawings, and can be withdrawn in the form of water or be condensed on the cold surfaces into snow. The deposition of mist is increased and the temperature is lowered as the rarefaction is increased.

There is an advantage in having the inlet into the chamber 4 at an elevated point above the ground, where the air contains less moisture, and for this purpose the pipe B may be extended to any desired length. I may, however, admit the air at the bottom and withdraw it at the top to supply the engine by reversing the construction of the apparatus.

In operating the two chambers 4 4' the valve 16 may be left open, and in this way I would secure in one chamber only (the lower chamber) the advantages of cooling with rarefaction. The valves 14 16 may both be left open, making practically one chamber, operated by simply refrigerating the air, which, however, is interrupted in its flow through the chamber by the alternate periods of rest and motion caused by the drawing of the air to the engine alternately through the conduits 3 and 3'.

From the foregoing description it is plain that the chambers 4 4' admit of great elasticity in construction. By changing the size of each chamber relative to the other or by differently apportioning the size of the chamber nearest to the engine relative to the engine-cylinder or adding more chambers in series a variety of degrees of rarefaction or progressive rarefaction can be obtained and a low temperature reached, the degree of rarefaction being limited by the cost of producing the same relative to the beneficial results obtained. This variation of operation can be done without conflicting in any way with the principle of my invention.

In Fig. 4, 20 is a single chamber provided with a cooling or insulating jacket and containing coils of pipe for the circulation of cooling fluid. It is provided at the air-inlet with a valve 16', which, being closed during the stroke of the piston when drawing air from this chamber, causes the production of a partial vacuum. During the next stroke of the piston the valve 16' is opened for a moment to admit a fresh supply of air to that already contained in the chamber, and the chamber full of air at atmospheric pressure is in quiet contact with the cold pipe until the completion of that stroke, wherein the air-cylinder of the engine is receiving air from another similar chamber arranged as is the chamber 6 6' in Fig. 2. By this means I am enabled to produce a very low temperature and to condense the moisture in the air in the form of water or snow, according to the degree of dryness required. This chamber 20 can likewise be operated without the inlet-valve 16'; but in such case it requires the use of a more intense refrigerant.

I have shown in Fig. 7 a construction of chamber which will produce rarefaction without the use of an inlet-valve, wherein the inlet-pipe B is smaller than the outlet 3 to the engine and is of such size that it will not supply air to the chamber as rapidly as it is withdrawn, so that a rarefaction ensues at each stroke in which the engine is drawing air from that chamber—i. e., at each alternate stroke of the piston. When operated thus without an inlet-valve, only the same degree of rarefaction can be obtained at each stroke; but I prefer to provide the chamber with an adjustable valve or damper 21, which, being more or less open, renders the degree of rarefaction variable, accordingly as it is adjusted to cause a greater or less disproportion between the size of the air-inlet and the outlet. The air, as in the other forms of apparatus, is in contact with cooling-surfaces while its flow is interrupted, and the moisture is thus most efficiently removed.

In Figs. 5 and 6 I show another construction of chamber jacketed with a surrounding space in which circulates a cooling fluid and adapted to be operated with or without an inlet-valve; but in the use of this form of chamber, as well as in the others, I employ the same provision for interruption of the flow of air by the use of two or more chambers or groups of chambers connected by conduits 3 3' to the engine, as described above. This chamber is of such size relative to the air-cylinder that the rarefaction shall produce a low temperature without other refrigerating means than the cooled surface of the jacket. Instead of internal cooling-pipes I interpose grids in the chamber for the moisture to condense upon and from which the moisture is conducted to the bottom of the chamber, where it can be removed. The grids that are here interposed soon become quite cold by contact with the cold rarefied air and serve to cause the precipitation of the moisture.

There are many devices for getting rid of the condensed water which will not flow into the atmosphere out of a chamber containing rarefied air; but I prefer to make use of a barometric column, Fig. 5, whereby the pipe 17, leading from the bottom of the chamber, extends into a receptacle 22 and has its discharge end immersed in a body of liquid held therein. The length of said pipe is regulated according to the degree of rarefaction obtained in the chamber.

While it is necessary to have two chambers or groups of chambers for the upstroke and the downstroke of the engine in order to get an interruption to the flow of air therein, it is advisable also to have a spare chamber which is ready for use in case of derangement of any part of the chamber apparatus, or when the conversion of the water into snow in the chamber necessitates the discontinuance of its use for the purpose of removing the snow a third chamber will prevent interruption to the process.

When supplying air for use in blast-furnaces and converters, it is of utmost importance that the moisture in the air be reduced to the very lowest point, and in order to do this I prefer to condense the moisture on the pipes in the form of snow. I desire particularly to prevent the formation of ice in the chambers. By having an intense refrigerant and interrupting the flow of air, so that it shall remain stationary in contact with the cooled surfaces, I am able to deposit the moisture in the form of snow and preferably that form in which it adheres to the pipes in the shape of shreds or "whiskers," which permits the circulation of air through it and around the pipes and gives substantial refrigeration even after the pipes are to all appearances heavily incrusted with snow. By these means I avoid removing the moisture speedily, but collect and retain it, and when it reaches such thickness of coating as to interfere either with the refrigeration or passage of air it can be removed. In order to remove the snow, I may use either of the following two methods, by which I am enabled to prevent any interruption to the constant supply of dry air to the engine or compressor, it being necessary to avoid such interruption in supplying air to blast-furnaces or converters.

In Fig. 2 the chambers 4 4' and 6 6' are put in connection with the engine by opening the conduit-valves 23 24, the valves 25 25' being closed. When the cooling-surfaces in one of these chambers—say the chamber 4 4'—becomes coated with snow of such thickness that its removal is desirable, the valves 24 and 25 are opened and the valves 23 and 25' closed, and the operation of drawing the cold-air supply is carried on through the chambers 5 5' and 6 6'. When another chamber—say the chamber 6 6'—is in turn coated with snow, reversion is made to the use of the chambers 4 4' and 5 5' and the valves 24 and 25 are closed, the valves 23 and 25' being open. In order to remove the snow from the disconnected chamber, I force through the cooling-pipes and through the jacket heated ammonia-gas, when using an ammonia-machine, and the heat of such gas quickly thaws the snow and converts it into water, in which condition it is removed. For the same purpose I may use a flow of steam or hot air or other material of proper temperature. As soon as the water is removed the chamber is ready for the refrigerating fluid, which should be promptly introduced to have the surfaces cold when brought into use. I consider three chambers to be sufficient, as the snow can be readily removed from one chamber and the chamber brought into use quickly.

The other method of removing snow is shown in Fig. 3 and does not necessitate the disconnection of any of the chambers during the removal. A perforated pipe 26 is placed in position above a row or series of the cooling-pipes and is connected with a tank or pump supplying brine. Salt has long been used to thaw snow and ice, and when brine contains a large amount of salt it can be reduced in temperature to about 5° above zero Fahrenheit without congealing. I prefer to use very cold brine, which being admitted to the pipe 26 is sprayed over the coils and on the sides of the chamber and melts the snow. When the temperature of the air in the chambers is reduced to a low degree and with brine at a low temperature, there would be very little or no absorption of moisture from the brine by the air, and a current of brine could, if desired, be kept running over the cooled surfaces to prevent the adhesion of snow without necessitating the interruption of use of the chamber. This plan eliminates all possibility of the pipes being insulated by a covering of snow and obtains the maximum of refrigerating effect.

In Figs. 8 and 9 I show a construction which gives great elasticity in the method of operation and which I shall claim specially. There are two or more series of chambers. In Fig. 8 I show three series, C D E. The members C C' C² of each series may be placed either in horizontal or vertical line or otherwise arranged. The size of the chambers of each series relative to the others of the same series may be varied to suit the conditions. The chambers are jacketed and cooling pipes or surfaces are placed within them. In the pipes connecting the members of the series with each other are valves $14'$, $14^a$, and $16^a$, operated from the engine by a connection $15^a$, and other valves $23^a$, $24^a$, $25^a$, and $25^b$ are placed in the pipes or boxes connecting the several series with the conduits 3 3'. If the air is only moderately humid, the valves $14'$ and $16^a$ may be disconnected from the mechanism $15^a$, and thus kept constantly open, thereby operating chambers C and C' as one chamber, in which the air is rarefied. With an increase in humidity the inlet-valve $16^a$ may be put in operation, thus enabling benefit to be derived by rarefying the air in the chamber C² before admitting it into the chambers C' C. When the atmosphere is excessively humid, all the valves $14'$, $14^a$, and $16^a$ may be operated, thus securing rarefaction progressively in all three chambers, or I may join the chambers C' and C² together by keeping open the valve $14^a$, thus producing the greatest rarefaction in the chamber C, which is constructed of such size that the rarefaction shall be sufficient in degree to produce a very low temperature, and thus insure the removal of the moisture. During periods when the temperature of the air is very low, with a correspondingly-low humidity, all the valves $14'$, $14^a$, and $16^a$ may be left open, so that the air can be drawn through to the engine without rarefaction, the cooling pipes and surfaces in the chambers in such case being sufficient to condense and collect the moisture. I am thus enabled to adapt the apparatus to meet the varying conditions of humidity of the atmosphere with much greater efficiency than if only one or two chambers were in use at a single time. As shown in Fig. 8, I prefer to use several series of chambers, as in Figs. 1 and 2, to secure an interruption of the flow of air therein and for convenience in removing snow, making repairs, &c.

In any of the forms of apparatus which I have shown I may regulate the refrigerating effect to suit the varying conditions of the atmosphere by regulating the supply of ammonia or other refrigerating fluid to the cooling-surfaces by manipulation of an expansion-valve. By means of such valve I may cause the refrigerating effect to be greater or less, as may be required.

By the methods I have described the air is rendered practically dry and the moisture is reduced to a small and uniform percentage. While there may be variations from time to time, yet they will be exceedingly slight and will have no material effect in the conduct of the operations for which the air is used, so that instead of the great and frequent changes naturally occurring in the air supplied to furnaces and converters there will be such uniformity as to eliminate from such metallurgical processes the uncertainty hitherto caused by the condition of the atmosphere.

I am the first in a continuous operation of supplying dry air to collect the condensed moisture on cooled surfaces in the form of snow and convert it back to water for the purposes of removal, and shall claim the same broadly. In the use of chambers whereby I produce and maintain a supply of rarefied air I do not confine myself to two chambers, but may construct in series an unlimited number thereof, as I find occasion therefor.

While the methods I have described for producing dry air are specially valuable in connection with blast-furnaces, steel-converters, cupolas, &c., yet I do not confine myself thereto, as they may be used for many other purposes in the arts.

I claim—

1. Apparatus for drying air comprising a cooling-chamber, means for cooling the same, means for drawing air from said chamber, and an inlet to said chamber less than sufficient to supply the draft of air from the chamber, whereby a rarefied condition of the air in the chamber is maintained; substantially as described.

2. The combination of a cooling-chamber, an engine for passing air therethrough, and mechanism actuated automatically and adapted to interrupt at frequent periods the connection of the air-cylinder of the engine with the cooling-chamber, whereby the air in passing through the chamber undergoes alternate periods of motion and rest, substantially as described.

3. The combination of two or more air-chambers connected in series, means for cooling the air, an engine connected to one chamber of the series for drawing air therethrough, a valve controlling the passage of air between the chambers and mechanism operating said valve correspondingly to the movements of the engine; substantially as described.

4. The combination of two or more air-chambers connected in series, means for cooling the air, an engine connected to one chamber of the series for drawing air therethrough, a valve controlling the passage of air between the chambers, and a valve controlling the inlet of air into another chamber of the series, and mechanism adapted to operate said valves successively, whereby, on opening the first valve and closing the second, the air-pressure in the chambers is balanced, and on closing the first valve and opening the second, air may be admitted to the second-named chamber to replace the withdrawal; substantially as described.

5. The combination of two or more air-chambers, connected in series, means for cooling the air, an engine connected to one chamber of the series for drawing air therethrough, a valve controlling the passage of air between the chambers, a valve controlling the inlet of air into another chamber of the series, and mechanism adapted to operate said valves successively, whereby on opening the first valve and closing the second the air-pressure in the chambers may be balanced, and on closing the first valve and opening the second air may be admitted to the second-named chamber to replace the withdrawal, and means for interrupting the flow of air through said chambers and imparting thereto alternate periods of flow and rest.

6. The combination of two or more groups of air-cooling chambers, each group consisting of two or more chambers, connected in series, an engine connected to one chamber of the series for drawing air therethrough, and a valve controlling the passage of air between the chambers, said engine being adapted to draw air alternately from said groups; and valve mechanism connected with a moving part and adapted to connect the air-cylinder of the engine alternately with the groups at regular periods, substantially as described.

7. The combination of two or more cooling-chambers, an engine for passing air therethrough, valve mechanism adapted to connect said chambers alternately with the engine, said valve mechanism being connected with a moving part, and adapted to be moved thereby to shift the course of the air, and means for rarefying the air in the chambers while in contact with the cooling-surfaces; substantially as described.

8. A blast-engine, cooling-chambers provided with cooled surfaces connected with the inlets for supplying air to the cylinder on the out and in strokes respectively, whereby the flow of air through the respective chambers is interrupted at periods corresponding to the strokes; substantially as described.

9. A blast-engine in combination with two or more chambers in series connected therewith by a conduit, a valve placed between the conduit and the series, the separate chambers in the series being connected by valves in the passages actuated from the engine and adapted to regulate the admission of air, the last chamber in the series having an opening through which the supply of atmospheric air can be admitted and regulated, said chambers containing artificially-cooled surfaces, and means whereby the valves in the passages connecting said conduits and chambers are manipulated to cause an interruption of the flow of air through the chambers in use; substantially as described.

10. An air-cooling chamber having cooling-surfaces on which moisture may be precipitated in the form of snow, and means adapted to discharge snow-removing liquid on the exterior of said surfaces; substantially as described.

11. The combination of two or more cooling-chambers and an engine for passing air therethrough, said engine being adapted to draw air alternately from said chambers, whereby the air in the respective chambers is given alternate periods of flow and rest, means for cooling the air, and a spare or reserve chamber adapted to be connected or disconnected with the engine to replace one of the other chambers; substantially as described.

12. Apparatus for cooling air comprising a chamber, means for cooling the air therein, an engine for drawing air therethrough, means for interrupting the draft of the engine and the flow of the air through the chamber, an inlet-valve, and means adapted to close the inlet-valve during the periods of draft of the engine; substantially as described.

13. The combination of a cooling-chamber, an engine for passing air therethrough, and mechanism actuated automatically and adapted to interrupt at frequent periods the connection of the air-cylinder of the engine with the cooling-chamber, whereby the air in passing through the chamber undergoes alternate periods of motion and rest, and means for rarefying the air during the periods of rest; substantially as described.

In testimony whereof I have hereunto set my hand.

JAMES GAYLEY.

Witnesses:
THOMAS W. BAKEWELL,
G. I. HOLDSHIP.